United States Patent [19]
Kuo

[11] Patent Number: 5,701,341
[45] Date of Patent: Dec. 23, 1997

[54] MULTI-PURPOSE BATTERY FOR A MOBILE TELEPHONE

[76] Inventor: Hung Chin Kuo, P.O. Box 82-144, Taipei, Taiwan

[21] Appl. No.: 257,566
[22] Filed: Jun. 10, 1994
[51] Int. Cl.[6] .................................................. H04M 1/00
[52] U.S. Cl. ............................................ 379/433; 379/434
[58] Field of Search .................................... 379/441, 433, 379/63, 434; 455/89, 90; 370/48

[56] References Cited

U.S. PATENT DOCUMENTS 5,003,576 3/1991 Helferich ................................... 379/63
5,265,158 11/1993 Tattari ..................................... 379/433

*Primary Examiner*—Jack K. Chiang
*Attorney, Agent, or Firm*—Alfred Lei

[57] ABSTRACT

A multi-purpose battery for a mobile telephone including a casing, a battery pack disposed within the casing, a vocal processor fitted in the casing and connected with the battery pack, the vocal processor including an analog/digital converter, a memory unit and a signal amplifier, a microphone connected with the vocal processor, a speaker connected with the vocal processor, a record switch connected with the vocal processor, a playback switch connected with the vocal processor, and an illumination switch connected between illuminating device and the battery pack.

1 Claim, 3 Drawing Sheets

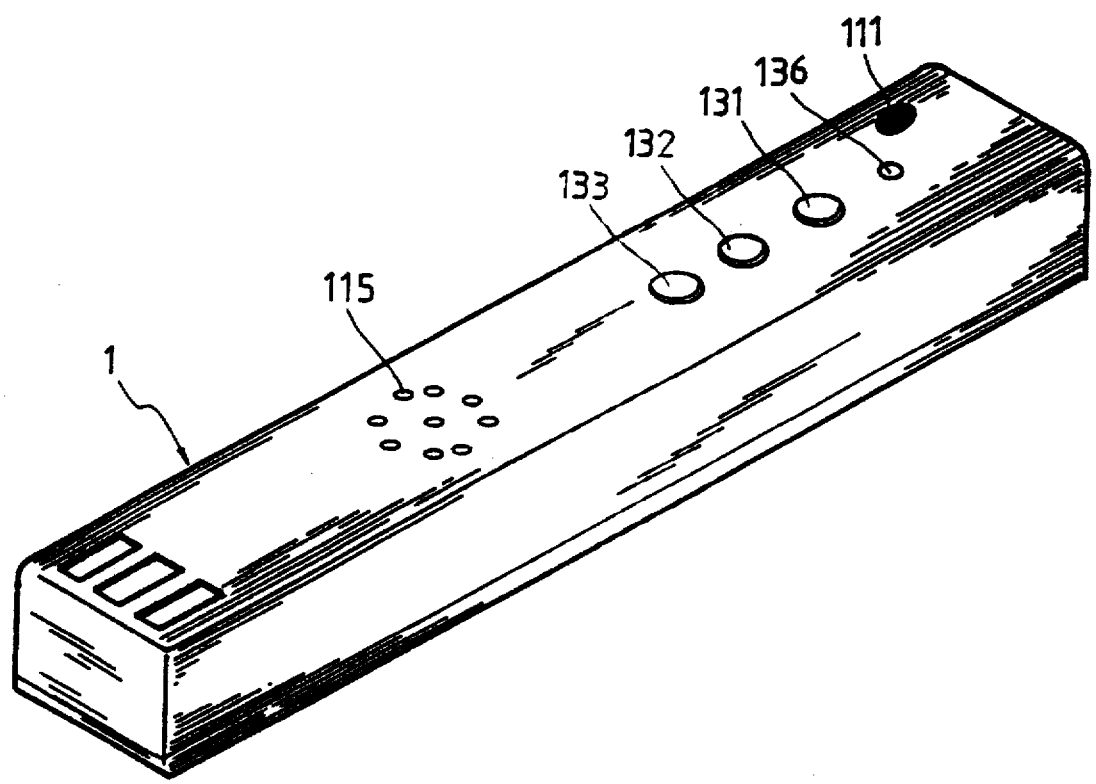
F I G. 1

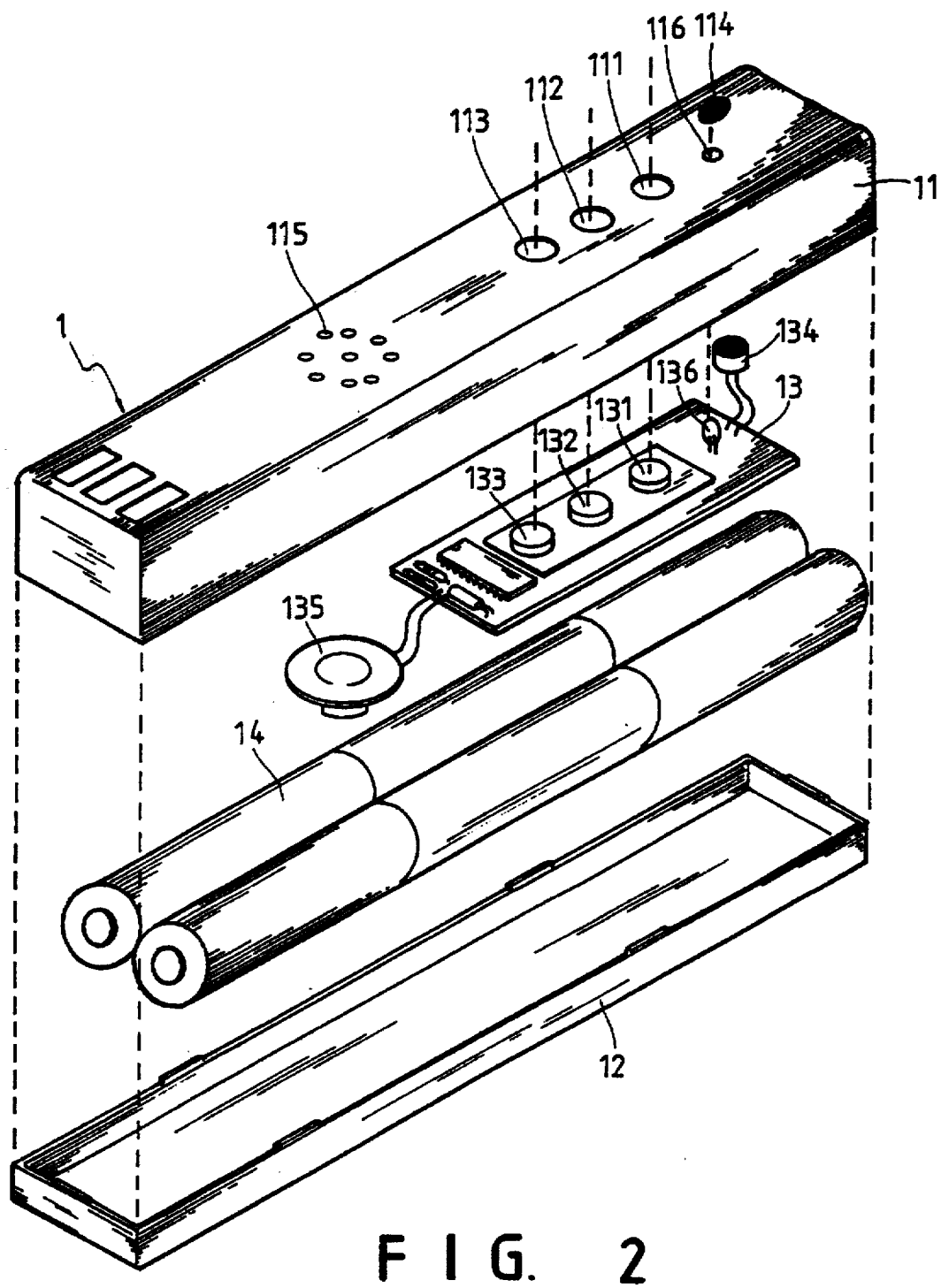
F I G. 2

MULTI-PURPOSE BATTERY FOR A MOBILE TELEPHONE

BACKGROUND OF THE INVENTION

It has been found that the mobile telephone can be carried everywhere thereby enabling the user to receive the incoming call at any time. However, in case the user is walking on the road or driving a car, it will be impossible for the user to use another hand to hold a pen for making a memo of the message. Also, in case a pen is not available, it will be impossible for the user to write down what he wants to memorize.

Therefore, it is the primary object of the present invention to provide a multi-purpose battery for a mobile telephone which may obviate and mitigate the above-mentioned drawbacks.

SUMMARY OF THE INVENTION

This invention relates to a multi-purpose battery for a mobile telephone.

It is the primary object of the present invention to provide a multi-purpose battery for a mobile telephone which can be used for recording the communication message of the mobile telephone.

It is another object of the present invention to provide a multi-purpose battery for a mobile telephone which can play back the recorded message.

It is still another object of the present invention to provide a multi-purpose battery for a mobile telephone which can be used as an electric torch.

It is still another object of the present invention to provide a multi-purpose battery for a mobile telephone which is low in cost.

It is a further object of the present invention to provide a multi-purpose battery for a mobile telephone which is fit for practical use.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 1 is a perspective view of the present invention;

FIG. 2 is an exploded view of the present invention; and

DETAILED DESCRIPTION OF THE PREFERRED EMBODIMENT

Figure 3:
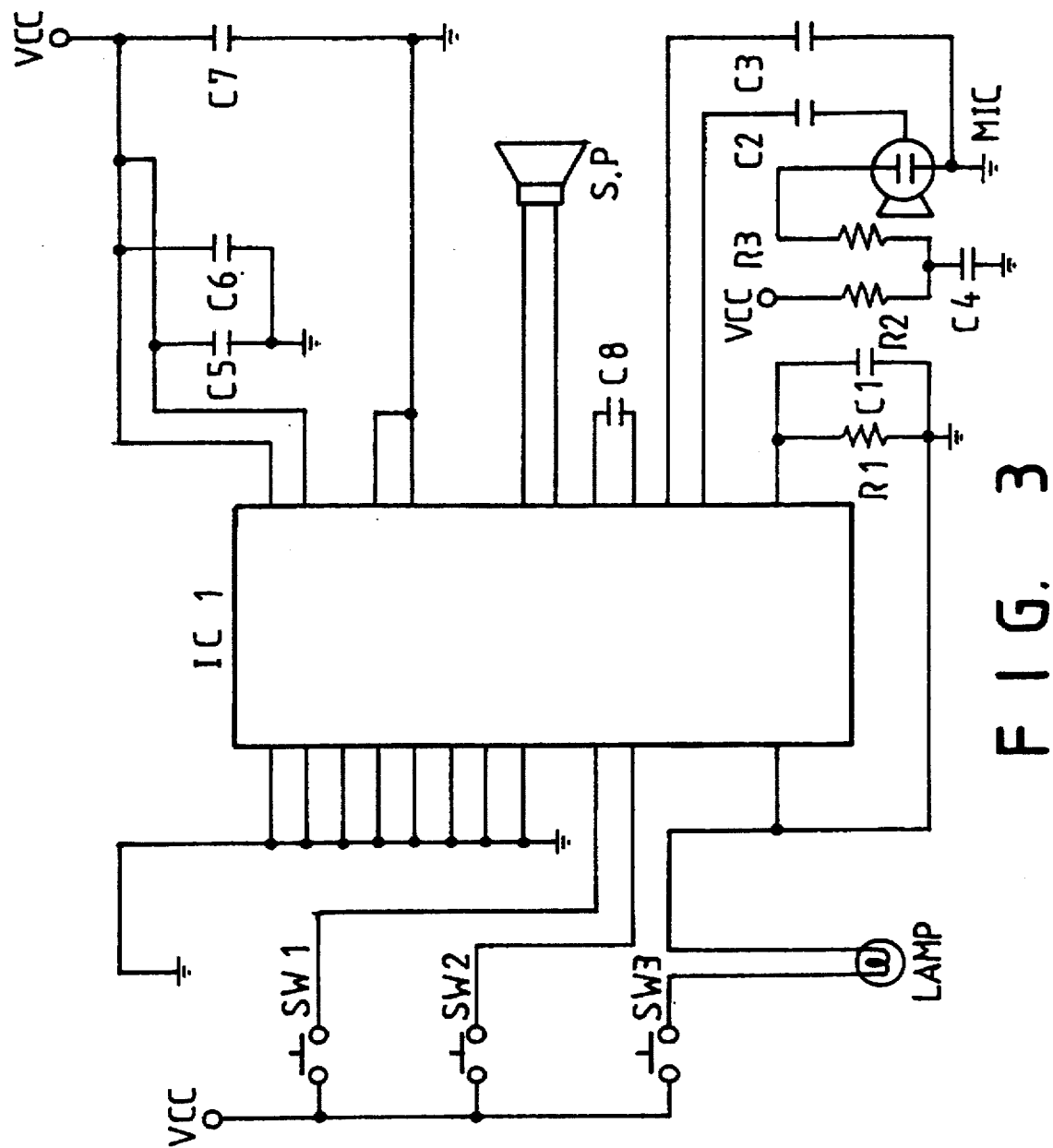
FIG. 3 is an electrical block diagram of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

With reference to the drawings and in particular to FIGS. 1 and 2 thereof, the multi-purpose battery for a mobile telephone according to the present invention comprises a casing 1 composed of an upper cover 11 and a lower cover 12. The upper cover 11 is formed with a first hole 114, a second hole 116, a third hole 111, a fourth hole 112, a fifth hole 113 and a plurality of perforations 115. A vocal processor 13 is fitted on the upper cover 11 and includes a record switch 131, a playback switch 132, and an illumination switch 133 adapted to engage the third hole 111, the fourth hole 112 and the fifth hole 113 respectively. Further, the vocal processor 13 is provided with a microphone 134, a loudspeaker 135 and a lamp 136 adapted to engage the first hole 114, the perforations 115 and the second hole 116 respectively.

Under the vocal processor 13 there is a battery pack 14 which is used as a power supply for a mobile telephone (not shown) and the vocal processor 13. The perspective view of the multi-purpose battery 1 is shown in FIG. 1. As the multi-purpose battery 1 is fitted at the rear side of the mobile telephone, it will be convenient to press the record switch 131 to record the communication message in the vocal processor 13 through the microphone 134.

Referring to FIG. 3, there is shown an electrical block diagram of the present invention. As illustrated, the IC1 is a single chip vocal processor which includes an analog/digital converter, a memory unit and a signal amplifier. As the microphone picks up a signal, the signal will be amplified and stored in the memory unit via the switch SW1. The signal can be played back simply by turning on the switch SW2. The switch SW3 is used to control the lamp 136.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A multi-purpose battery for a mobile telephone comprising:

a casing;

a battery pack disposed within said casing for powering the mobile telephone;

a vocal processor fitted in said casing and connected with said battery pack, said vocal processor including an analog/digital converter, a memory unit and a signal amplifier;

a microphone connected with said vocal processor;

a speaker connected with said vocal processor;

a record switch connected with said vocal processor;

a playback switch connected with said vocal processor; and an illumination switch connected between illuminating means and said battery pack.

* * * * *